United States Patent Office 2,971,971
Patented Feb. 14, 1961

2,971,971

ADDITION OF METHYLDICHLOROSILANE TO ACRYLONITRILE IN PRESENCE OF A DIAMINE-TRIALKYLAMINE-PdCl₂ CATALYST COMPOSITION

Ben A. Bluestein, Schenectady, N.Y., assignor to General Electric Company, a corporation of New York No Drawing. Filed Dec. 29, 1958, Ser. No. 783,103

8 Claims. (Cl. 260—448.2)

This invention relates to a process for the preparation of alpha-cyanoethylmethyldichlorosilane. More particularly this invention relates to the preparation of alpha-cyanoethylmethyldichlorosilane by the addition of methyldichlorosilane to acrylonitrile in the presence of a catalyst composition comprising a diamine, a trialkylamine, and palladium (II) chloride, $PdCl_2$. This invention is also directed to the foregoing catalyst composition per se.

Prior to the present invention, a number of methods have been suggested for the addition of hydrolyzable silicon hydrides to alpha-beta-unsaturated olefinic nitriles, such as acrylonitrile. However, when these prior art methods have been applied to the reaction of methyldichlorosilane with acrylonitrile, a number of difficulties have been encountered. For example, in the foregoing addition reaction under the influence of heat alone, temperatures of the order of from 175 to 400° C. are required, and at these temperatures the acrylonitrile has a tendency to undergo thermal polymerization, which of course, reduces the yield of desired addition product. In other prior art methods, it is often found that the yields of the desired addition product are quite low or that the reaction is not self-sustaining. For example, in the reaction of methyldichlorosilane with acrylonitrile employing platinum chloride or chloroplatinic acid as a catalyst, the catalyst tends to become poisoned during the course of the reaction and it is necessary to add additional catalysts in order to complete the reaction.

The present invention is based on my discovery of an efficient three component catalyst system which avoids all of the disadvantages inherent in the prior art. This catalyst system allows the addition of methyldichlorosilane to acrylonitrile at reasonably low temperatures without polymerization of the acrylonitrile, without poisoning of the catalyst, and with a high yield of alpha-cyanoethylmethyldichlorosilane.

The diamine component of the three component catalyst system employed in my invention has the formula:

(1) $(R)(R')N(CH_2)_mN(R')_2$

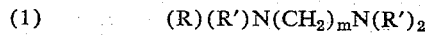

where $m$ is an integer equal to from 1 to 6, inclusive, R is a lower alkyl radical and R' is a member selected from the class consisting of hydrogen, lower alkyl radicals, aminoalkyl radicals, and alkylaminoalkyl radicals, dialkylaminoalkyl radicals and mixtures thereof. Specific diamines within the scope of Formula 1 include, for example, N,N,N',N'-tetramethylethylenediamine
N,N,N',N'-tetraethylethylenediamine
N,N,N'-trimethylethylenediamine
N,N-dimethyl-N',N'-diethylethylenediamine
N,N-dimethylethylenediamine
N-methyl-N,N',N'-triethylethylenediamine
N,N,N',N",N"-pentamethyldiethylenetriamine
N,N,N',N'-tetramethylmethylenediamine
N,N,N'-trimethyl-N'-ethylethylenediamine N,N,N',N'-tetramethylpropylenediamine
N,N,N'-trimethyl-N'-octylethylenediamine
N,N',N",N"-tetramethyldiethylenetriamine
N,N,N'-trimethyldiethylenetriamine
N-methylhexamethylenediamine Although the foregoing group of specific diamines is necessarily limited, it should be obvious to a person skilled in the art that any other diamine within the scope of Formula 1 may also be employed in the practice of the present invention.

The trialkylamine, which is one of the components of the three component catalyst of the present invention, is preferably a trialkylamine in which the alkyl radicals are lower alkyl radicals e.g., alkyl radicals containing from 1 to 8 carbon atoms. These trialkylamines may be described broadly by the following formula:

(2) $(Y)_3N$

where Y is an alkyl radical. Among the many trialkylamines within the scope of Formula 2 can be mentioned, for example, trimethylamine, triethylamine, tributylamine, trioctylamine, methyldiethylamine, dimethylbutylamine, methylbutyloctylamine, dimethyloctadecylamine, etc.

In carrying out the process of the present invention, the two principal reactants, of course, are the methyl hydrogen dichlorosilane and the acrylonitrile. Since the reaction of these two materials to produce alphacyanoethylmethyldichlorosilane involves equimolar amounts of the two ingredients, these ingredients are used in equimolar amounts in the preferred embodiment of the invention. However, no adverse effect exists by using the molar excesses of either of the ingredients. For example, from 0.1 to 10 moles of methyldichlorosilane can be employed per mole of acrylonitrile. However, no particular advantage is derived by using these two ingredients in other than equimolar proportions.

In carrying out the process of the present invention, the ratio of the various components of the catalyst composition to each other and to the methyldichlorosilane and acrylonitrile may vary within wide limits. In general, the three component catalyst composition is employed in an amount of from 0.1 to 20 mole percent of palladium (II) chloride, from 0.1 to 20 mole percent of the trialkylamine within the scope of Formula 2 and from 0.1 to 20 mole percent of the diamine within the scope of Formula 1, the foregoing mole percents being based on the total number of moles of acrylonitrile and methyldichlorosilane employed in the reaction. While the broad ranges of the components of applicant's three component catalyst system have been described above, the optimum catalyst composition comprises, on the basis of the total number of moles of methyldichlorosilane and acrylonitrile in the reaction mixture, from 1 to 10 mole percent palladium (II) chloride, from 1 to 10 mole percent of the trialkylamine within the scope of Formula 2 and from 1 to 10 mole percent of the diamine within the scope of Formula 1.

Since the ratio of components in my catalyst compositions per se is the same as the ratio employed in carrying out the reaction of the present invention, it is obvious that the three component catalyst system comprises, on a mole ratio basis, from 0.1 to 20 and preferably from 1 to 10 moles of palladium (II) chloride, from 0.1 to 20 and preferably from 1 to 10 moles of trialkylamine within the scope of Formula 2, and from 0.1 to 20 and preferably from 1 to 10 moles of diamine within the scope of Formula 1.

In carrying out the process of the present invention, the various components of the reaction mixture may be added to a reaction vessel in any desired order. No adverse effect has been observed by varying the order of the addition of any of the components. Since the reaction mixture is a heterogeneous mixture, it is desirable to agitate the reaction mixture to obtain optimum reaction rates. However, agitation is not critical to the successful completion of the reaction. One of the most useful methods of agitating the reaction mixture is by heating the mixture at its reflux temperature until the reaction is completed. Gentle refluxing of the reaction mixture provides suitable agitation and optimum reaction rates and yields. Generally, the temperature of the reaction mixture varies during the course of the reaction and varies also depending on the particular components of the catalyst system and on the concentration of the components of the catalyst system. Generally, the reflux temperature during reaction is from about 50° C. to about 120 to 130° C.

In addition to the refluxing of the reaction mixture under atmospheric conditions, the reaction mixture may be heated at the reflux temperature corresponding to reduced pressures or elevated pressures. Thus, with low reaction pressures, the reaction temperature may be as low as 30 to 40 °C. At higher temperatures, the reflux temperature will increase correspondingly, for example, to a temperature of 120 to 150 or 160° C. While increasing the pressure and reflux temperature increases the reaction rate somewhat, the most economical conditions for effecting the reaction are at atmospheric pressure in conventional equipment rather than in the pressure equipment required for higher pressure operation. It should also be understood that the reaction of the present invention may be effected by placing the reactants in a pressure vessel and heating the contents of the vessel to an elevated temperature with or without agitation provided. In addition to conducting the reaction at reflux temperature, the reaction will also proceed at temperatures as low as room temperature (i.e.) a temperature of around 20° C. (with or without agitation).

The reaction of the present invention may also be effected in either the presence or the absence of additional inert solvents. In the preferred embodiment of the present invention, no solvent is employed. However, the use of solvents which are inert under the reaction conditions is not precluded. Such solvents include, for example, acetonitrile, and adiponitrile. No particular advantage is derived from the use of solvents in the reaction.

From the foregoing discussion, it is seen that the reaction of the present invention is effected by merely adding the methyldichlorosilane, the acrylonitrile, the palladium (II) chloride, the trialkylamine, and the diamine to a suitable reaction vessel and maintaining the temperature at the desired temperature for the time necessary to complete the reaction. The time required to complete the reaction varies according to a number of factors such as the particular reactants involved, the temperature of the reaction, the concentration of the catalyst and the nature of the catalyst. In the reaction between methyldichlorosilane and acrylonitrile employing palladium (II) chloride, N,N,N',N'-tetramethylethylenediamine and tributylamine as a catalyst with each of the catalyst components being present in an amount equal to 2 to 5 mole percent based on the total number of moles of methyldichlorosilane and acrylonitrile, complete reaction is effected at reflux temperature and atmospheric pressure in from 17 to 24 hours.

After completion of the reaction, the alpha-cyanoethylmethyldichlorosilane can be recovered from the reaction mixture by any number of methods. One method comprises fractional distillation of the reaction mixture and collection of the alpha-cyanoethylmethyldichlorosilane fraction. Another method comprises cooling of the reaction mixture to room temperature and subsequently bubbling dry hydrogen chloride therethrough to form the hydrochlorides of the trialkylamine and the diamine. These hydrochlorides precipitate from the reaction mixture and after filtration of the precipitate the filtrate is fractionally distilled to isolate the alpha-cyanoethylmethyldichlorosilane.

In order that those skilled in the art may better understand how the present invention may be practiced, the following examples are given by way of illustration and not by way of limitation.

*Example 1*

To a reaction vessel was charged a mixture of ingredients and the ratio of 59.3 moles of methyl hydrogen dichlorosilane, 40.7 moles of acrylonitrile, 1.87 moles N,N,N',N'-tetramethylethylenediamine, 4.50 moles tributylamine and 3.02 moles palladium (II) chloride. This reaction mixture was heated at its reflux temperature for 19 hours during which time the reflux temperature rose from about 51° C. to about 122° C. At the end of this time, the reaction mixture was fractionally distilled and the alpha-cyanoethylmethyldichlorosilane was collected at 92 to 98° C. at 7 mm. (literature boiling point for this compound is 90° C. at 7 mm.). The identity of the alpha-cyanoethylmethyldichlorosilane was confirmed by infrared analysis. The total amount of alpha-cyanoethylmethyldichlorosilane recovered corresponded to a conversion of 69% based on the limiting reactant acrylonitrile.

*Example 2*

When the procedure of Example 1 is repeated employing ingredients in the ratio of 55 moles acrylonitrile, 45 moles methyldichlorosilane, and 1 mole each of N,N,N'-trimethylethylenediamine, triethylamine, and palladium (II) chloride, the percent conversion of the limiting reactant methyl hydrogen dichlorosilane is greater than 60%.

*Example 3*

When the procedure of Example 2 is repeated with the same reactants but with the diamine, the trialkylamine and the palladium (II) chloride each present in an amount equal to 2 mole percent, the percent conversion of the limiting reactant methyldichlorosilane to alpha-cyanoethylmethyldichlorosilane is greater than 65%.

*Example 4*

When the procedure of Example 1 is repeated employing in the reaction, on a mole ratio basis, 50 moles each of acrylonitrile and methyldichlorosilane, 2 mole N,N,N',N'-tetramethylethylenediamine, 30 moles of tributylamine and 15 moles of palladium (II) chloride, the percent conversion of the starting materials to alpha-cyanoethylmethyldichlorosilane is greater than 75%.

*Example 5*

When the procedure of Example 1 is repeated employing reactants on a mole ratio basis of 50 moles methyldichlorosilane, 50 moles acrylonitrile, 10 moles of N,N,N',N'-tetramethylethylenediamine, 10 moles of methylethylbutylamine and 10 moles of palladium (II) chloride over 65% of the starting materials are converted to alpha-cyanoethylmethyldichlorosilane.

While the foregoing examples have been directed to only a few of the catalyst composition variables of the present invention because of space limitations, it should be understood that the process of the present invention involves broadly the reaction of methyldichlorosilane with acrylonitrile to form alpha-cyanoethylmethyldichlorosilane with a catalyst composition comprising palladium (II) chloride, any of a trialkylamines within the scope of Formula 2 and any of the diamines within the scope of Formula 1. The components of the catalyst may be varied within the ranges previously described.

The alpha-cyanoethylmethyldichlorosilane which is prepared by the process of the present invention is particularly useful in the preparation of organosilicon elastomers which are to be subjected to environments which contain hydrocarbon solvents. For example, the alpha-cyanoethylmethyldichlorosilane of the present invention can be converted to a rubber by mixing one part by weight of the alpha-cyanoethylmethyldichlorosilane, with one part by weight of dimethyldichlorosilane and slowly adding this mixture to 10 parts by weight of diethyl ether and 10 parts by weight of ice water. After thoroughly agitating the reaction mixture, it is allowed to separate into phases, the top phase of which is an oil layer. This oil layer is separated and consists of a hydroxy chain-stopped silicone fluid containing recurring alpha-cyanoethylmethylsiloxane units and dimethylsiloxane units. This fluid is converted to a gum by mixing the fluid with potassium hydroxide in the ratio of about 30 parts per million of potassium hydroxide per part of fluid. After heating this mixture at a temperature of about 150° C. for six hours, a gum having a viscosity in excess of 1 million centipoises is obtained. One hundred parts by weight of this gum is then milled with 40 parts, by weight, of silica filler and 3 parts by weight of benzoyl peroxide. The resulting material is cured in a mold at 150° C. for 15 minutes and then aged in a hot air oven at 200° C. for 24 hours to produce a silicone rubber which is characterized by all of the desirable features of conventional silicone rubbers and which has the additional feature of superior resistance to swelling in hydrocarbon solvents. For example, the gum described above exhibits less than one-half of the swell of a conventional dimethyl silicone elastomer when soaked in toluene for one hour.

What I claim as new and desire to secure by Letters Patent of the United States is:

1. A method of forming alpha-cyanoethylmethyldichlorosilane which comprises contacting methyldichlorosilane and acrylonitrile in the presence of a catalyst composition comprising from 0.1 to 20 mole percent palladium (II) chloride, from 0.1 to 20 mole percent of a trialkylamine, and from 0.1 to 20 mole percent of a diamine having the formula:

$$(R)(R')N(CH_2)_mN(R')_2$$

where $m$ is an integer from 1 to 6, inclusive, R is a lower alkyl radical, and R' is a member selected from the class consisting of hydrogen, lower alkyl radicals, aminoalkyl radicals, alkylaminoalkyl radicals, dialkylaminoalkyl radicals and mixtures thereof, said mole percents being based on the total number of moles of methyldichlorosilane and acrylonitrile.

2. The method of claim 1 in which the trialkylamine is tributylamine.

3. The method of claim 1 in which the diamine is N,N,N',N'-tetramethylethylenediamine.

4. The process of forming the alpha-cyanoethylmethyldichlorosilane which comprises contacting methyldichlorosilane and acrylonitrile in the presence of from 0.1 to 20 mole percent palladium (II) chloride, from 0.1 to 20 mole percent tributylamine, and from 0.1 to 20 mole percent N,N,N',N'-tetramethylethylenediamine, said mole percents being based on the total number of moles of methyldichlorosilane and acrylonitrile.

5. A catalyst composition comprising ingredients in the ratio of from 0.1 to 20 moles palladium (II) chloride, from 0.1 to 20 moles of a trialkylamine and from 0.1 to 20 moles of a diamine having the formula:

$$(R)(R')N(CH_2)_mN(R')_2$$

where $m$ is an integer equal to from 1 to 6, inclusive, R is a lower alkyl radical, and R' is a member selected from the class consisting of hydrogen, lower alkyl radicals, aminoalkyl radicals, alkylaminoalkyl radicals, dialkylaminoalkyl radicals, and mixtures thereof.

6. The catalyst composition of claim 5 in which the trialkylamine is tributylamine.

7. The catalyst composition of claim 5 in which the diamine is N,N,N',N'-tetramethylethylenediamine.

8. A catalyst composition comprising ingredients in the ratio of from 0.1 to 20 moles palladium (II) chloride, from 0.1 to 20 moles tributylamine and from 0.1 to 20 moles N,N,N',N'-tetramethylethylenediamine.

References Cited in the file of this patent

UNITED STATES PATENTS 2,686,798    Gmitter _____ Aug. 17, 1954

FOREIGN PATENTS 1,118,500    France _____ Mar. 19, 1956

OTHER REFERENCES

Gutbier et al.: "Berichte der Deutschem Chemischen Gesellschaft," vol. 39 (1906), pp. 2716–20.

Goodman et al.: "Jour. Am. Chem. Soc.," vol. 79 (June 1957), pp. 3073–7.